United States Patent
Constantinou et al.

(10) Patent No.: US 6,923,857 B2
(45) Date of Patent: Aug. 2, 2005

(54) NON-EFFLORESCING CEMENTITIOUS BODIES

(75) Inventors: Anastasia George Constantinou, Engomi (CY); Colin Dow, Golspie (GB); Charles Hubert Fentiman, Crawley (GB); Mary Ruth Hoy, Crawley (GB); Karen Louise Scrivener, St Fontaines St. Martin (FR)

(73) Assignee: Lafarge Aluminates, Paris Cedex (FR)

( * ) Notice: Subject to any disclaimer, the term of this patent is extended or adjusted under 35 U.S.C. 154(b) by 0 days.

(21) Appl. No.: 10/240,184

(22) PCT Filed: Mar. 26, 2001

(86) PCT No.: PCT/GB01/01301

§ 371 (c)(1),
(2), (4) Date: Jun. 27, 2003

(87) PCT Pub. No.: WO01/72658

PCT Pub. Date: Oct. 4, 2001

(65) Prior Publication Data

US 2004/0035328 A1 Feb. 26, 2004

(30) Foreign Application Priority Data

Mar. 29, 2000 (GB) .............................................. 0007621

(51) Int. Cl.⁷ ............................. C04B 28/06; C04B 7/32
(52) U.S. Cl. ....................... 106/695; 106/692; 106/694; 427/397.7; 428/703
(58) Field of Search ................................. 106/692, 694, 106/695; 427/397.7; 428/703

(56) References Cited

U.S. PATENT DOCUMENTS

| | | | | |
|---|---|---|---|---|
| 4,357,166 A | * | 11/1982 | Babcock | 106/650 |
| 5,366,549 A | * | 11/1994 | Imaizumi et al. | 106/715 |
| 6,641,658 B1 | * | 11/2003 | Dubey | 106/705 |
| 2002/0157573 A1 | * | 10/2002 | Pellett | 106/400 |
| 2002/0161071 A1 | * | 10/2002 | Mills et al. | 524/2 |

FOREIGN PATENT DOCUMENTS

| | | | |
|---|---|---|---|
| JP | 61-286256 A | * | 12/1986 |
| JP | 09-48649 A | * | 2/1997 |

OTHER PUBLICATIONS

Derwent Abstract No. 1999–562325.abstract of South Africa Patent Specification No. 9811374A (Aug. 1989).*

* cited by examiner

*Primary Examiner*—Anthony J. Green
(74) *Attorney, Agent, or Firm*—Nils H. Ljungman & Associates

(57) ABSTRACT

A non-efflorescing cementitious body is formed from sources of calcium aluminate, calcium silicate, calcium sulphate and reactive silica, these ingredients being present in such relative proportions that, upon hydration, both monosulphate ($C_3A.C\hat{S}.12H$) and hydrated alumina ($AH_3$) are formed. Also disclosed is a hydraulic binder and a paste from which such bodies can be formed and a method for forming such bodies. In addition to exhibiting low efflorescence, these bodies retain satisfactory physical properties, especially good durability to natural weathering conditions.

23 Claims, 1 Drawing Sheet

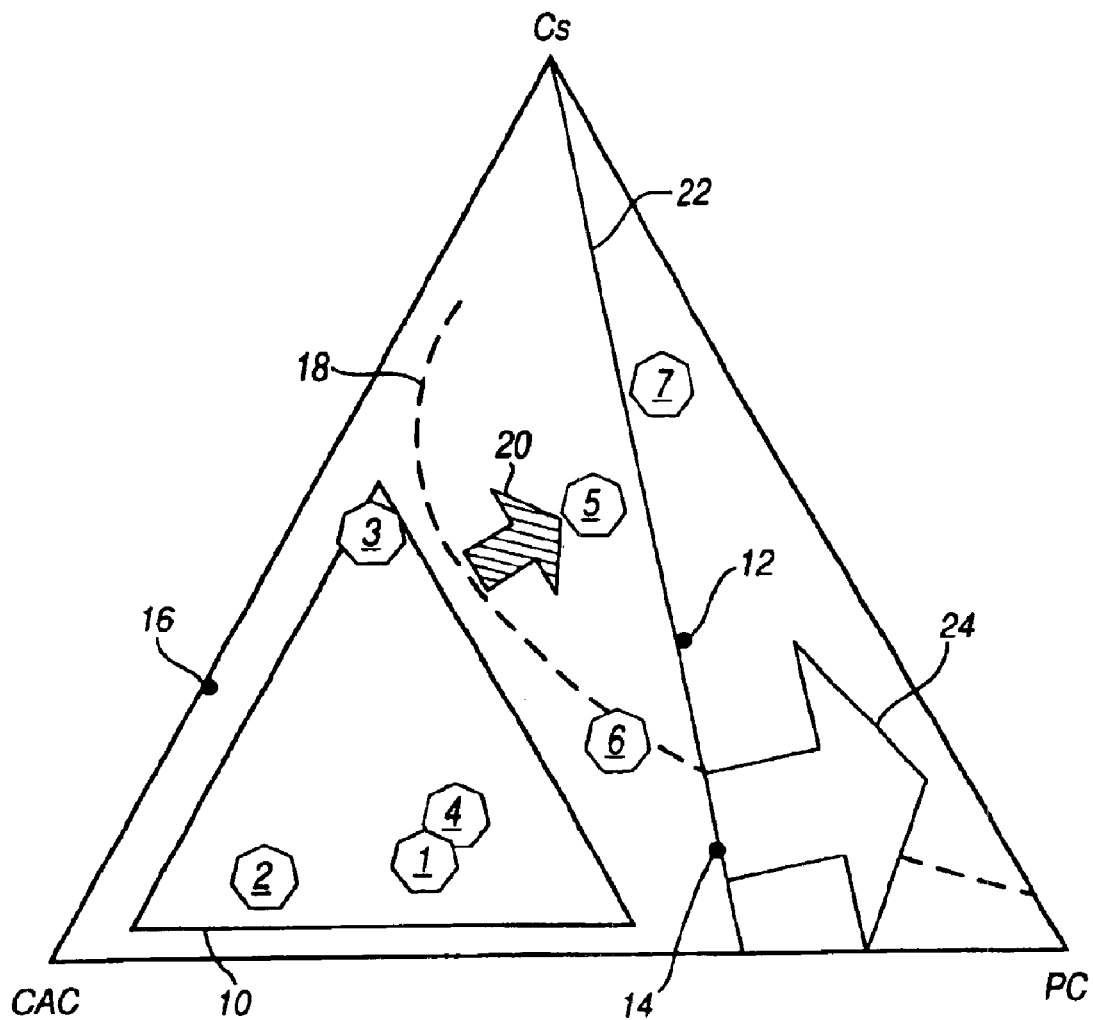

NON-EFFLORESCING CEMENTITIOUS BODIES

FIELD OF THE INVENTION

The present invention relates to non-efflorescing cementitious bodies, and in particular to a hydraulic binder and paste from which such bodies can be made, and to a method for making such bodies.

BACKGROUND OF THE INVENTION

Efflorescence, which is the presence of calcium carbonate or other relatively insoluble salts in powdery form on the surface of concrete or masonry products, is a familiar problem in the concrete industry. The salts are produced unintentionally and, whilst they do not generally lead to any significant failure, they affect the aesthetic quality of the product.

Efflorescence is most often found to be calcite (calcium carbonate) produced by a reaction between free calcium hydroxide in the product and atmospheric carbon dioxide. The free calcium hydroxide is produced by the normal hydration reactions of Portland cement, and tends to migrate to the surface of the product where the reaction with atmospheric carbon dioxide can occur. The timing of the appearance of efflorescence varies and can occur immediately following formation of the product or after the product has been installed. As an example, one product on which efflorescence can occur is a concrete roofing tile. The relatively minor whitening of cementitious products by other mechanisms is not included in the term "efflorescence", as that term is used herein.

Depending upon the circumstances, efflorescence can be more or less difficult to remove. Some treatments, such as the use of an acid wash, are only temporary and the problem often reappears after a period of time.

Efflorescence can be reduced, but not eliminated, by the incorporation in the product of fine fillers which act to block the pores in the product, examples being fumed silica, metakaolin, limestone filler or polymers. An expensive method for preventing efflorescence is to coat the product with an impermeable polymer, but ensuring the impermeability of a thin polymer coating can be difficult.

Another method for reducing, but not totally eliminating, efflorescence in the product is to include in its composition a material rich in reactive silica. The calcium hydroxide reacts preferentially with the excess reactive silica, thereby preventing its reaction with atmospheric carbon dioxide.

The notation used herein is that commonly used by cement chemists, in which: $C=CaO$; $S=SiO_2$; $A=Al_2O_3$; $\hat{S}=SO_3$; and $H=H_2O$.

We are aware of British patent GB 2099808B (Chichibu Cement K K) which discloses a hydraulic cement which is allegedly not subject to efflorescence. The cement comprises specified relative amounts of a calcium sulphoaluminate or calcium aluminate compound, a calcium silicate compound, calcium sulphate, granulated blast furnace slag and a minor amount of an oxycarboxylic acid. The patent states that in order to ensure that no efflorescence is generated, it is very important that all the calcium hydroxide present in the system is consumed by reaction with the calcium sulphoaluminate ($C_4A_3\hat{S}$) and the gypsum ($C\hat{S}H_2$) to form ettringite, ($C_3A.3C\hat{S}.32H$), according to the formula:

$$C_4A_3\hat{S}+8C\hat{S}+6CH+90H \rightarrow C_3A.3C\hat{S}.32H$$

The oxycarboxylic acid is said to reduce the generation of calcium hydroxide in the product so that this reaction can proceed to completion.

We have found however that, although the oxycarboxylic acid and the formation of ettringite may act to eliminate the precipitation of CH and therefore to reduce efflorescence, the physical properties of the product obtained from this cement are not sufficient for many applications. In particular, we have found that compositions prepared according to such a formulation suffered dimensional instability i.e. expansion in humid conditions and very high porosity. These properties were found, in comparison with ordinary mortars, to have an adverse effect upon other properties such as strength, permeability, acid resistance and a relatively high leach rate when exposed to water. Furthermore, we have found that such an open structure resulted in a risk of carbonation which would further reduce durability.

OBJECTS OF THE INVENTION

It is an object of the present invention to produce a cementitious body in which efflorescence is reduced or eliminated while maintaining the physical properties of the product at satisfactory levels.

It is a further object of this invention to provide a hydraulic binder for forming such a non-efflorescing cementitious body.

It is a still further object of the present invention to provide an aqueous paste for forming such a non-efflorescing cementitious body.

It is yet a further objective of this invention to provide a method of forming such a non-efflorescing cementitious body.

SUMMARY OF THE INVENTION

We have surprisingly discovered that these objects and other useful benefits can be achieved where the ingredients are present in such relative proportions that, upon hydration, not merely ettringite, but the mineral mono-sulphate and hydrated alumina are also formed.

Thus, according to a first aspect of the invention, there is provided a hydraulic binder for forming a non-efflorescing cementitious body, comprising at least the following ingredients, namely a source of calcium silicate, a source of a calcium aluminate, a source of sulphate and a source of reactive silica, the ingredients being present in such relative proportions that, upon hydration, both mono-sulphate ($C_3A.C\hat{S}.12H$) and hydrated alumina ($AH_3$) are formed.

We have found that not only is the desired effect of reduced efflorescence achieved, dimensional stability is very good with a very low leach rate and very good acid resistance. Both very good strength development and good strength retention on aging are also achieved.

While hydrates of the calcium silicate may be generated in situ by the use of separate sources of calcium oxide and reactive silica as ingredients, it is preferred to use a material which already comprises hydratable calcium silicate. Similarly, while the calcium aluminate may be generated in situ by the use of separate sources of calcium oxide and alumina as ingredients, it is preferred to use a material which already comprises a calcium aluminate.

The source of calcium silicate may be Portland cement. Portland cement comprises a number of species in addition to calcium silicate, including calcium aluminate and calcium sulphate species. However, in order to ensure that, upon hydration, both mono-sulphate and hydrated alumina are formed, additional sources of calcium aluminate and sulphate must be added.

The source of calcium aluminate or additional calcium aluminate may be a calcium aluminate cement or clinker or a calcium sulpho aluminate cement or clinker. Examples include Secar 51, Ciment Fondu or CSA clinker, in which the alumina content is at least 25%.

The source of sulphate or additional sulphate may be constituted by a source of calcium sulphate, for example selected from Anhydrite, gypsum and hemi-hydrates (plaster of Paris) a synthetic calcium sulphate or alternatively an aluminium sulphate or an ammonium sulphate.

The source of reactive silica is preferably ground granulated blast furnace slag, or less preferably a pozzolanic ingredient, such as metakaolin, fly ash, fumed silica and perlite fines. In a typical hydraulic binder, a blast furnace slag level of from about 15% to about 35%, based on the weight of the total dry mix, has been found to be suitable, higher levels being more suitable for bulk products, while lower levels are preferred for coatings on roofing tiles.

In use, the hydraulic binder according to the invention is mixed with water, or an aqueous composition containing additional ingredients, whereupon the hydration process begins. When sufficient water is used, a paste is formed, which is a suitable physical form for many applications, including the application of non-efflorescing coatings to concrete bodies such as roofing tiles.

According to a second aspect of the invention, there is therefore provided an aqueous paste for forming a non-efflorescing cementitious body, formed from at least the following ingredients, namely a source of calcium silicate, a source of calcium aluminate, a source of calcium sulphate and a source of reactive silica, the ingredients being used in such relative proportions that both mono-sulphate and hydrated alumina are formed in the hardened paste.

The paste is preferably formed by the addition of water to a pre-mixed dry binder.

The paste preferably has a water content such that the water over binder ratio is between 0.2 and 1.0, most preferably between 0.28 and 0.68.

The ingredients of the hydraulic binder or the paste are preferably present in such relative proportions that, upon hydration, strätlingite ($C_2ASH_8$) (otherwise known as gehlenite hydrate) and calcium hydrosilicates are additionally formed. The ingredients will usually be present in such relative proportions that, upon hydration, substantially no Portlandite (CH) is formed.

While not wishing to be bound by theory, we believe that during the first stage of hydration after the calcium sulphate has been is consumed, along with calcium aluminate to form the ettringite.

We have found that ettringite subsequently reacts with available calcium and alumina ions in solution, e.g. from the hydration of calcium aluminates, to form mono-sulphate:

$$2CA+C_3A.3C\bar{S}.32H+4C+4H \rightarrow 3C_3A.C\bar{S}.12H$$

Hydration of the remaining calcium aluminate proceeds eventually to the formation of strätlingite with the reactive silica and silica released by the hydration of the Portland cement. This formation of strätlingite is preceded by the formation of meta-stable calcium aluminate hydrates such as $C_2AH_8$ and $CAH_{10}$ in mixtures with very low amounts of calcium sulfate.

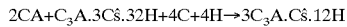

$$CA+S\bigstar+C^\uparrow \rightarrow C_2ASH_8$$

★from reactive silica source or Portland cement
↑from lime source of Portland cement In certain circumstances the calcium aluminates may react to form the stable phase $C_3AH_6$ directly without subsequent reaction to form strätlingite. For instance this may be the case if high ambient temperature during hydration.

In order to ensure that ettringite, mono-sulphate, hydrated alumina and strätlingite form in the paste, the relative levels of Portland cement (where this is used as a source of calcium silicate), additional calcium aluminate, additional sulphate, and reactive silica need to be carefully chosen. We have found that successful results can be obtained when the binder is formed of:

from 5%, most preferably at least 20%, up to 40%, most preferably no more than 55%, of Portland cement or clinker as a source of calcium silicate;

from 40%, most preferably at least 50%, to 90%, most preferably no more than 75%, of a source of additional calcium aluminate selected from calcium aluminate cement or clinker and calcium sulpho aluminate cement or clinker, the source of calcium aluminate having at least 25% alumina or a C/A ratio of less than 3; and from 3%, most preferably at least 5%, to 50% of a source of additional sulphate, such as calcium sulphate, at least 25% of which being $SO_3$, these percentages being based upon the total weight of the calcium aluminate, sulphate and Portland cement.

The preferred level of reactive silica, depending upon its source, is from 10%, most preferably at least about 15%, to no more than 49%, most preferably not more than 35%, based on the weight of the total cementitious dry mix.

The total alumina content is preferably at least 15% by weight of the total content of the binder.

Upon hydration, the setting time of the hydraulic binder according to the invention, by the EN196 VICAT method, is under two hours. It has been found that this can be modified by the use of admixtures.

The phases present in the product of the invention, namely ettringite, mono-sulphate, hydrated alumina (in the form of alumina gel or Gibbsite) and strätlingite (if present) can be detected by X-ray diffraction, differential thermal analysis and secondary electron imaging with a scanning electron microscope.

It has been found that although ettringite is an early formed phase within the range specified by this invention it undergoes reaction, through solution, with further calcium and aluminium oxides (from remaining unreacted Calcium aluminates) leading to the formation of mono-sulphate. The relative ratio of the two in the final product depends on where the composition lies within the range specified by this patent. In some compositions the ettringite may be substantially consumed by 28 days, but evidence of its presence remains, e.g. crystals within pores. However, in this system it can be shown that the presence of mono-sulphate follows an earlier formation of ettringite, irrespective of how much ettringite may be left after a period of hydration, such as 7 days or 28 days.

The presence of detectable quantities of hydrated alumina confirms that there is substantially no residual CH present in the hardened paste since these phases are not stable together. This confirms that this binder will be non-efflorescing, in the context of carbonation of hydrated lime.

The hardened pastes made according to this patent have been found to be free from deleterious expansion that we have found in humid conditions with for formulations described by British patent GB 2099808B (Chichibu Cement K K).

According to our findings complete hydration of the reactive components does not usually occur. At the end of the initial hardening period the originally available moisture has been used for the formation of hydrates and some has indeed been lost from the system through surface evaporation leaving porosity. In such cases some of the raw materials remain un-reacted. This is normal in cement chemistry and the subsequent hydration of these components in moisture does not generally lead to expansion. This is because new hydrates form only in available spaces such as pores and once there is no further space within the microstructure precipitation of these hydrates cease.

It is well known that an exception to this can be the formation of ettringite in solid matrix at late ages, which in certain conditions can lead to considerable expansion leading to the effective destruction of the early-formed microstructure.

We have investigated this with pastes in which residual calcium sulphate and a source of calcium ions (e.g. Portland cement) remain after the complete reaction of the calcium aluminates and others in which the paste has formed a dense matrix of ettringite and hydrated alumina. We have found that in the presence of a source of moisture the components react to form ettringite at late ages. A number of possible reactions can be written of which the following is a representative example.

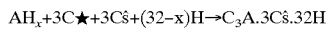

★from reacting Portland cement through solution

We believe that it is the late formation of ettringite which causes the expansion observed for compositions described by British patent GB 2099808B (Chichibu Cement K K). Compositions covered by the present invention do not leave residual, un-reacted calcium sulphate since it is entirely consumed in the early stage reactions leading to the formation of ettringite and subsequently, mono-sulphate.

The invention is further illustrated in the accompanying FIG. 1, which is an illustrative ternary diagram for the calcium sulphate (Cs)/calcium aluminate cement (CAC)/Portland cement system (PC).

In addition to the roles identified for the source of reactive silica, e.g. ground granulated slag, we have found that this component reduces the activity of calcium in the system and with it the risk of expansion due to late formation of ettringite due to reaction with uncombined calcium sulphate.

In addition to not being susceptible to efflorescence it was surprisingly found that the materials according to the invention showed greatly improved resistance to leaching and erosion by weak acids (pH>4. We found this improved performance could be attributed to the presence of hydrated alumina which is not dissolved by acid at this pH and which blocks the pores of the micro-structure protecting the materials from attack.

The paste may further comprise additional ingredients selected from the following, these ingredients being included in the dry binder or in the aqueous composition added to make the paste or workable mix.

Pigments may be added according to the desired application of the body. For example, where the body is a coating on a roofing tile, a pigment level of up to 5%, based on the total solids content, is suitable.

To enhance the acid and freeze-thaw performance of the body fine sand may be added. Durability can be enhanced by optimising the type and quantity of sand. Too much sand can lead to a rough surface. The rheology of the paste is also modified by the presence of sand. Other rheology modifiers may be used.

To enhance frost performance, other additives and fillers may be incorporated as indicated by the trade literature for such materials.

Plasticisers may be added to the paste in order to allow the level of water to be reduced while retaining satisfactory rheology.

However, some plasticisers may lead to poor surface characteristics. Their use is therefore not essential. Furthermore, plasticisers act as retardants, i.e. they result in an increase in hardening time.

The hydraulic binders according to the invention can be used for the formation of a range of bodies, which may constitute part of a product, especially constituting an exposed surface of a product, or a bulk product. Generally, the bodies are formed by adding water or an aqueous composition to the dry binder, either in sufficient quantity to form a workable mix or in greater quantities to form a paste, optionally adding further ingredients, and then allowing the composition to set.

According to a third aspect of the invention, there is therefore provided a non-efflorescing cementitious body, formed from at least the following ingredients, namely a source of calcium silicate, a source of calcium aluminate, a source of sulphate and a source of reactive silica, the ingredients being used in such relative proportions that ettringite, mono-sulphate and hydrated alumina are present in the body.

The bodies according to the invention exhibit low efflorescence. Efflorescence of a body may be determined efficiently using a "foam" test. In this test, the sample is placed face down on a foam or sponge saturated with water for 1 week. The experiment is carried out at 10° C. Efflorescence is assessed qualitatively, by observation, and measured semi-quantitatively using a colorimeter for changes in the lightness value. If the colour becomes lighter, i.e. whiter, this indicates surface precipitation i.e. efflorescence.

The optional ingredients which can be added to the binder include aggregate such as coarse sand, or gravel, where a concrete product is to be formed. The aggregate over cement ratio is preferably up to 6, most preferably up to 2.

The physical properties of bodies according to the invention after complete hydration are preferably as follows: a surface hardness of more than 2H, preferably more than 9H (using a pencil scratch method); a density of at least 1.8 $kgm^{-3}$; a volume expansion on exposure to water of less than 5%, preferably less than 1%; and a porosity of less than 30%, most preferably less than 20%.

According to yet a further aspect of the invention, there is provided a method of forming a non-efflorescing cementitious body, comprising curing an aqueous composition formed from at least the following ingredients, namely a source of calcium silicate, a source of calcium aluminate, a source of sulphate and a source of reactive silica, the ingredients being used in such relative proportions that ettringite, mono-sulphate and hydrated alumina are present in the paste.

Where the body is constituted by a coating on concrete articles, such as roofing tiles, plates, cladding and walls, the method may comprise coating an exterior surface of a freshly made concrete article with the paste and curing the article and the coating together at a relative humidity of from 75% RH to 100% RH at a temperature of from 0° C. to 50° C. for a period from 1 to 24 hours. The paste may be applied to the roofing tile by extrusion, by the use of a coating knife or by a brush process, especially if the flow radius of the paste is above 80 mm.

Where the body is a bulk product, the aqueous mix, including optional ingredients such as aggregates as required, is added to a mould and allowed to set under substantially ambient conditions, preferably avoiding temperatures below 0° C. and a relative humidity below 50% RH. Setting may take from 30 minutes to 3 hours, while the ultimate physical properties may not be reached until at least 7 days later.

BRIEF DESCRIPTION OF THE DRAWING

The invention will now be further described with reference to the following non-limiting examples. The formulations describe in the following examples are identified on the accompanying FIG. 1, which shows the boundary conditions of the present invention and the approximate locations of the following examples.

The invention will now be further described with reference to the following non-limiting examples. The formulations described in the following examples are identified on the accompanying FIG. 1.

EXAMPLE 1

As an example of a formulation according to the present invention, the following ingredients were blended together to form a hydraulic binder composition and were cast forming small blocks:

| | |
|---|---|
| Secar 51 | 45.6% |
| Anhydrite | 9.0% |
| Portland Cement | 20.4% |
| Ground Granulated Blast-furnace Slag | 25.0% |

Pastes were made by mixing the above binder with water in a ratio of 0.7 parts water to 1 part binder. The pastes had a density of 1.8 and a porosity of 49% (which corresponds to about 25% in a mortar formulation with an aggregate cement ratio of 1). This sample did not show efflorescence in the foam test and its volume expansion when placed in water was substantially zero. Furthermore wetting and drying, in contrast to Comparative Example 5 below, did not seem to cause any detriment to the sample.

X-ray diffraction and Scanning Electron Nicroscopy of the body confirmed the presence of ettringite, mono-sulphate, hydrated alumina and strätlingite.

EXAMPLE 2

As another example of a formulation according to the present invention, the following ingredients were blended together to form a hydraulic binder composition and were cast forming small blocks:

| | |
|---|---|
| Secar 51 | 60.0% |
| Anhydrite | 7.0% |
| Portland Cement | 8.0% |
| Ground Granulated Blast-furnace Slag | 25.0% |

Pastes were made by mixing the above binder with water in a ratio of 0.32 parts water to 1 part binder. This sample did not show efflorescence in a foam test and its volume expansion when placed in water was substantially zero. Furthermore wetting and drying, in contrast to Comparative Example 5 below, did not seem to cause any detriment to the sample.

X-ray diffraction and Scanning Electron Microscopy of the body confirmed the presence of ettringite at the early stages, mono-sulphate, hydrated alumina and strätlingite. Calcium hydroxide was found not to be present.

EXAMPLE 3

As an example of a formulation just within the limit of the present invention, the following ingredients were blended together to form a hydraulic binder composition and were cast forming small blocks:

| | |
|---|---|
| Secar 51 | 34.0% |
| Anhydrite | 37.0% |
| Portland Cement | 4.0% |
| Ground Granulated Blast-furnace Slag | 25.0% |

Pastes were made by mixing the above binder with water in a ratio of 0.45 parts water to 1 part binder. This sample did not show efflorescence in the foam test and no visible signs of expansion when placed in water. Further wetting and drying did not seem to cause any detriment to the sample.

X-ray diffraction and Scanning Electron Microscopy of the body confirmed the presence of ettringite, some mono-sulphate, and a little hydrated alumina. Calcium hydroxide was found not to be present.

EXAMPLE 4

As an example of the strength development of mortars made with binder of formulation according to the present invention, the following ingredients were blended together to form a hydraulic binder composition:

| | |
|---|---|
| Secar 51 | 45.6% |
| Anhydrite | 13.0% |
| Portland Cement | 20.4% |
| Ground Granulated blast-furnace slag | 21.0% |

Mortars were made by mixing the above binder composition with sand and water according to EN196 procedures (sand: binder ratio of 3 and water/binder ratio of 0.5). Blended together to form a mortar composition and tested according to the requirements of EN196: Not only was this mortar found to be non-expansive the strength development was very rapid in the early stages with a 6 hour compressive strength of 15.5 MPa and further strength development was also very good with 49 MPa being reached by 28 days.

COMPARATIVE EXAMPLE 5

As an example of a formulation according to GB 2099808 the following ingredients were blended together to form a hydraulic binder composition:

| | |
|---|---|
| Secar 51 | 18.0% |
| Anhydrite | 39.0% |
| Portland Cement | 18.0% |
| Ground Granulated blast-furnace slag | 24.0% |
| Sodium citrate | 1.0% |

Pastes were made by mixing the above binder composition with water in a ratio 0.7 parts water to 1 part binder. The pastes were found to be of very low density and rather deliquescent to touch. On wetting, rapid expansion took place leading to disintegration of the sample. This improved by forming the composition into a mortar, but the properties remained unsatisfactory. X-ray diffraction and scanning electron microscopy of the body confirmed the presence of ettringite but hydrated alumina and strätlingite were not detected.

COMPARATIVE EXAMPLE 6

As a further example of a formulation according to GB 2099808 the following ingredients were blended together to form a hydraulic binder composition:

| | |
|---|---|
| Secar 51 | 20.0% |
| Anhydrite | 14.2% |
| Portland Cement | 20.0% |
| Ground Granulated blast-furnace slag | 44.8% |
| Sodium citrate | 1.0% |

Mortars were made by mixing the above binder composition with sand and water according to EN196 procedures (sand:binder ratio of 3 and water/binder ratio of 0.5). Although this mortar was found to be non-expansive the strength development was slow compared with Portland cement, reaching only 26 MPa at 28 days. This would be insufficient for many concreting applications, since it also exhibited high porosity. This example may usefully be compared to Example 4.

COMPARATIVE EXAMPLE 7

As an example of a formulation found to be prone to efflorescence and expansion the following ingredients were blended together to form a hydraulic binder composition:

| | |
|---|---|
| Secar 51 | 6.7% |
| Anhydrite | 50.7% |
| Portland Cement | 42.6% |
| Ground Granulated blast-furnace slag | 25.0% |

Pastes were made by mixing the above binder composition with water in a ratio 0.45 parts water to 1 part binder. The pastes were found to be of relatively low density and deliquescent to touch. On wetting, rapid and extreme expansion took place leading to the volume increasing by a third accompanied by the effective disintegration of the sample as it became a pulp. X-ray diffraction and scanning electron microscopy of the body confirmed the presence of ettringite but it also showed that significant amounts of calcium hydroxide had been formed along with gypsum. Hydrated alumina and strätlingite were not found to be present.

Referring to FIG. 1, the thick lined triangle 10 shows the boundary conditions of the present invention. The three black spots 12, 14, 16 show the positions for ettringite, mono-sulphate, and ettringite+$AH_3$ respectively. The broken line 18 shows the boundary of secondary formation of ettringite expansion, greater expansion resulting as one moves in the direction of the arrow 20. The thin line 22 shows the boundary of the formation of Portlandite efflorescence, greater efflorescence resulting as one moves in the direction of the arrow 24. The numbers in open heptagons refer to the approximate locations of the Examples herein. The GGBS content is not shown in FIG. 1.

COMPARATIVE EXAMPLE 8

As an example of a formulation according to GB 2099808 the following ingredients were blended together to form a hydraulic binder composition:

| | |
|---|---|
| Secar 51 | 15.6% |
| Anhydrite | 34.2% |
| Portland Cement | 25.2% |
| Ground Granulated blast-furnace slag | 25.0% |

Pastes were made by mixing the above binder composition with water in a ratio 0.7 parts water to 1 part binder. The pastes were found to be of very low density and rather deliquescent to touch. On wetting, rapid expansion took place leading to disintegration of the sample. This improved by forming the composition into a mortar, but the properties remained unsatisfactory. X-ray diffraction and scanning electron microscopy of the body confirmed the presence of ettringite and some gypsum but hydrated alumina, calcium hydroxide and strätlingite were not detected.

What is claimed is:

1. A non-efflorescing cementitious body being formed upon curing of an aqueous paste formed by the addition of water to a pre-mixed dry binder comprising from 10% to 49% by weight of a first ingredient comprising a source of active silica, and a remainder including:
   (i) from 40% to 90% by weight of a second ingredient comprising a source of calcium aluminate selected from calcium alumiate cement or clinker and calcium sulpho aluminate cement or clinker, said source of calcium aluminate having at least 25% alumina or a C/A ratio of less than 3;
   (ii) from 5% to 55% by weight of a third ingredient comprising Portland cement or clinker as a source of calcium silicate; and
   (iii) from 3% to 50% by weight of a fourth ingredient comprising a source of sulphate at least 25% being $SO_3$;
   said ingredients being present in such relative proportions that, upon hydration, both mono-sulphate ($C_3A.C\hat{s}.12H$) and hydrated alumina ($AH_3$) are formed.

2. The body according to claim 1, having a density after complete hydration of at least 1.8 $kgm^{-3}$.

3. The body according to claim 1, wherein, after complete hydration, the body has a volume expansion on exposure to water of less than 5%.

4. The body according to claim 1, having a porosity after complete hydration of less than 30%.

5. A method of forming a non-efflorescing cementitious body as a coating on a concrete article, said body being formed upon curing of an aqueous paste formed by the addition of water to a pre-mixed dry binder comprising from 10% to 49% by weight of a first ingredient comprising a source of active silica, the remainder including: (i) from 40% to 90% by weight of a second ingredient comprising a source of calcium aluminate selected from calcium aluminate cement or clinker and calcium sulpho aluminate cement or clinker, said source of calcium aluminate having at least 25% alumina or a C/A ratio of less than 3; (ii) from 5% to 55% by weight of a third ingredient comprising Portland cement or clinker as a source of calcium silicate; and (iii) from 3% to 50% by weight of a fourth ingredient comprising a source of sulphate at least 25% being $SO_3$; said ingredients being present in such relative proportions that, upon hydration, both mono-sulphate ($C_3A.C\hat{s}.12H$) and hydrated alumina ($AH_3$) are formed, wherein said body is constituted by a coating on a concrete article, the method comprising coating an exterior surface of a hardened or fresh concrete article with said paste and curing the article and the coating together at a relative humidity of from 75% RH to 100% RH at a temperature of from 0° C. to 50° C. for a period of from 30 minutes to 24 hours.

6. The method according to claim 5, wherein said concrete article is a member selected from consisting of: roofing tiles, plates, cladding and walls.

7. A hydraulic binder for forming a non-efflorescing cementitious body, comprising from 10% to 49% by weight of a first ingredient comprising a source of active silica, and a remainder including:
   (i) from 40% to 90% by weight of a second ingredient comprising a source of calcium aluminate selected from calcium aluminate cement or clinker and calcium sulpho aluminate cement or clinker, said source of calcium aluminate having at least 25% alumina or a C/A ratio of less than 3;
   (ii) from 5% to 55% by weight of a third ingredient comprising Portland cement or clinker as a source of calcium silicate; and
   (iii) from 3% to 50% by weight of a fourth ingredient comprising a source of sulphate at least 25% being $SO_3$.

8. The hydraulic binder according to claim 7, said ingredients being present in such relative proportions that, upon hydration, both mono-sulphate ($C_3A.C\bar{S}.12H$) and hydrated alumina ($AH_3$) are formed.

9. The hydraulic binder according to claim 7, said ingredients being present in such relative proportions that, upon hydration, ettringite ($C_3A.3C\bar{S}.32H$) is formed as an intermediate in the formation of said mono-sulphate ($C_3A.C\bar{S}.12H$).

10. The hydraulic binder according to claim 7, said ingredients being present in such relative proportions that, upon hydration, strätlingite ($C_2ASH_8$) and calcium hydro-silictes are additionally formed.

11. The hydraulic binder according to claim 7, said ingredients being present in such relative proportions that, upon hydration, substantially no Portlandite (CH) is formed.

12. The hydraulic binder according to claim 7, wherein said source of calcium aluminate is a calcium a luminate cement or clinker or a calcium sulpho aluminate cement or clinker.

13. The hydraulic binder according to claim 7, wherein said source of calcium sulphate is anhydrite, gypsum or hemihydrate.

14. The hydraulic binder according to claim 7, wherein said source of calcium silicate is Portland cement.

15. The hydraulic binder according to claim 7, wherein said source of reactive silica is ground granulated blast furnace slag or a pozzolanic ingredient.

16. The hydraulic binder according to claim 9, wherein said pozzolanic ingredient is a member selected from group consisting of: metakaolin, fly ash, fumed silica and perlite fines.

17. The hydraulic binder according to claim 7, wherein the binder comprises at least 15% by weight of alumina.

18. An aqueous paste for forming a non-efflorescing cementitious body, formed by the addition of water to a pre-mixed dry binder comprising from 10% to 49% by weight of a first ingredient comprising a source of active silica, and a remainder including:
   (i) from 40% to 90% by weight of a second ingredient comprising a source of calcium aluminate selected from calcium aluminate cement or clinker and calcium sulpho aluminate cement or clinker, said source of calcium aluminate having at least 25% alumina or a C/A ratio of less than 3;
   (ii) from 5% to 55% by weight of a third ingredient comprising Portland cement or clinker as a source of calcium silicate; and
   (iii) from 3% to 50% by weight of a fourth ingredient comprising a source of sulphate at least 25% being $SO_3$, said ingredients being present in such relative proportions that, upon hydration, both mono-sulphate ($C_3A.C\bar{S}.12H$) and hydrated alumina ($AH_3$) are formed.

19. The paste according to claim 18, having a water over binder ratio of between 0.2 and 1.0.

20. The paste according to claim 19, wherein the water over binder ratio is between 0.28 and 0.68.

21. The paste according to claim 18, further comprising aggregate, with an aggregate over cement ratio of up to 6.

22. The paste according to claim 18, wherein the aggregate over cement ratio is up to 2.

23. The paste according to claim 18, further comprising additional ingredients selected from the group consisting of: pigments, acid and freeze-thaw performance enhancers, frost performance enhancers, rheology modifiers, plasticisers optionally together with accelerator, anti-segregation additives, defoamers, surface enhancement agents, hydrophobic agents, and acid resistance agents, and mixtures thereof.

* * * * *

UNITED STATES PATENT AND TRADEMARK OFFICE
CERTIFICATE OF CORRECTION

PATENT NO. : 6,923,857 B2 Page 1 of 1
APPLICATION NO. : 10/240184
DATED : August 2, 2005
INVENTOR(S) : Anastasia George Constantinou et al.

It is certified that error appears in the above-identified patent and that said Letters Patent is hereby corrected as shown below:

In column 7, line 22, after 'Electron', delete "Nicroscopy" and insert --Microscopy--.

In column 11, line 10, Claim 10, before 'arc', delete "silictes" and insert --silicates--.

In column 11, line 15, Claim 12, after the second occurrence of 'calcium', delete "a luminate" and insert --aluminate--.

In column 12, line 29, Claim 23, after 'with', delete "accelerator," and insert --accelerators,--.

Signed and Sealed this

First Day of August, 2006

JON W. DUDAS
*Director of the United States Patent and Trademark Office*